United States Patent
Tsuneyoshi et al.

(10) Patent No.: US 7,195,190 B2
(45) Date of Patent: Mar. 27, 2007

(54) RECORDING AND/OR REPRODUCING DEVICE HAVING A RETAINING MECHANISM TO BE STABLY ATTACHABLE/DETACHABLE

(75) Inventors: Nobutaka Tsuneyoshi, Kanagawa (JP); Hiromi Inoguchi, Kanagawa (JP); Kouji Kobayashi, Kanagawa (JP)

(73) Assignee: Mitsumi Electric Co., Ltd., Tama (JP)

( * ) Notice: Subject to any disclaimer, the term of this patent is extended or adjusted under 35 U.S.C. 154(b) by 0 days.

(21) Appl. No.: 11/189,423

(22) Filed: Jul. 26, 2005

(65) Prior Publication Data

US 2006/0169825 A1    Aug. 3, 2006

(30) Foreign Application Priority Data

Dec. 21, 2004    (JP)    ............................... 2004-369127

(51) Int. Cl.
*G11B 15/66* (2006.01)
(52) U.S. Cl. ............................... 242/332.4; 242/332.7; 242/532.1; 242/532.7
(58) Field of Classification Search ................ 242/332, 242/332.4, 332.7, 332.8, 532.1, 532.6, 532.7, 242/582; 360/132
See application file for complete search history.

(56) References Cited

U.S. PATENT DOCUMENTS

| 3,934,840 | A | 1/1976 | Inaga |
| 6,322,014 | B1 * | 11/2001 | Nemeth ..................... 242/332.4 |
| 6,330,983 | B1 * | 12/2001 | Augustin .................. 242/332.4 |
| 6,471,150 | B1 * | 10/2002 | Tsuchiya et al. ......... 242/332.4 |
| 2004/0004142 | A1 * | 1/2004 | Gavit et al. .............. 242/332.4 |
| 2004/0099757 | A1 | 5/2004 | Masuda |
| 2004/0129816 | A1 | 7/2004 | Hamming |

FOREIGN PATENT DOCUMENTS

WO        WO 00/30095 A1    5/2000

* cited by examiner

*Primary Examiner*—William A. Rivera
(74) *Attorney, Agent, or Firm*—Frishauf, Holtz, Goodman & Chick, P.C.

(57) ABSTRACT

A pin retainer locks a leader pin during a movement of a pull-out assembly where the leader pin is coupled to a grabber between a grabber holder and a take-up reel. The pin retainer is urged toward a locking position by a spring. When the grabber comes close to a cartridge, a first releasing arm makes the pin retainer retract to a retracted position opposed to urging force of the spring.

2 Claims, 14 Drawing Sheets

RECORDING AND/OR REPRODUCING DEVICE HAVING A RETAINING MECHANISM TO BE STABLY ATTACHABLE/DETACHABLE

This application claims priority to Japanese Patent Application JP 2004-369127, the disclosure of which is incorporated herein by reference.

BACKGROUND OF THE INVENTION

This invention relates to a recording and/or reproducing device represented by DLT (digital linear tape) or LTO (linear tape open) and, in particular, to a retaining (holding) mechanism for making a leader pin stored in a cartridge retain (hold) to a grabber.

Recording and/or reproducing devices of the type described are developed for use in back-up ones of computer systems and various types of the recording and/or reproducing devices have been proposed in prior art. Such a recording and/or reproducing device serving as the LTO is disclosed, for example, in the patent document WO 00/30095 A1.

The recording and/or reproducing device may be also a tape drive in which a cartridge having a single reel (a supply reel) can be installed. The cartridge may be also called a cassette. The recording and/or reproducing device contains a take-up reel therein. When the cartridge is installed in the recording and/or reproducing device, a magnetic tape is pulled out of the cartridge and then is wound by the take-up reel through a tape-transport path. The tape-transport path is for guiding the magnetic tape pulled out of the cartridge in a magnetic head. The magnetic head exchanges information between the tape and the magnetic head. In addition, the take-up reel is rotationally drivable by means of a real motor.

In the manner which is disclosed in the above-mentioned patent document WO 00/30095 A1, the cartridge comprises a housing, a rotationally drivable supply reel accommodated in the housing, the magnetic tape wound onto the reel hub of the supply reel, and a coupling element which is connected to the magnetic tape in the free end area of the magnetic tape and which is held in a coupling position. The coupling element is also called a leader pin.

In order to enable the magnetic tape contained in the cartridge to be wound onto the take-up reel, the magnetic tape should first be brought to the take-up reel with the aid of the leader pin. For this purpose, the recording and/or reproducing device has a pull-out element. The pull-out element is adopted to be coupled to the leader pin. The pull-out element is also called a grabber.

In order to enable the grabber to be coupled to the leader pin, the recording and/or reproducing device includes retaining means adapted to detachably retain the grabber. The retaining means are movably between a standby position and an operating position. A movement of the retaining means into their operating position causes a movement of the grabber in a coupling direction and the grabber and the leader pin to be coupled. On the other hand, a movement of the retaining means out of their operating position causes a movement of the grabber in a direction opposite to the coupling direction and the grabber and the leader pin to be disengaged.

In order to enable the grabber and the leader pin, after they have been coupled, i.e. a pull-out assembly thus formed, to be moved away from the retaining means an to be moved up to the reel hub of the take-up real, the recording and/or reproducing device includes actuating means. The actuating means are simply formed by a pull-out tape. The pull-out tape is guided along the above-mentioned tape-transport path. The pull-out tape is also called a leader tape.

During a movement of the pull-out assembly between the retaining means and the take-up reel, it is necessary that the grabber and the leader pin coupled thereto remain securely connected to one another. In order to guarantee this secure connection, the grabber has been provided with a locking element. The locking element is movable with respect to the grabber. That is, the locking element is mounted on the grabber so as to be movable transversely to a coupling direction. With the leader pin coupled to the grabber, the locking element, which is movable with respect to the grabber, cooperates with a part of the leader pin in order to hold the grabber and the leader pin together. In this event, a pressure spring urges the locking element towards a locking position for cooperation with a central portion of the leader pin. That is, in the coupled condition of the grabber and the leader pin, the locking element is loaded by the pressure spring. At any rate, the locking element, which is movable transversely to the coupling direction and which is urged against a locking surface of the grabber, ensures that the leader pin is locked to the grabber in a stable and reliable manner.

In the manner which is described above, the conventional recording and/or reproducing device uses, as a leader pin holding part for making the leader pin hold the grabber, the locking element which is movable transversely to the coupling direction.

In the manner which is described above, the conventional leader pin holding part (the locking element) is always applied with urging force (pressure force) in a direction to fix to the leader pin by the pressure spring. Therefore, the leader pin must forcefully be removable to the grabber by force larger than the urging force (the pressure force) with the leader pin slid to a tip portion of the locking element. In other words, a load applies to the leader pin. It results in degradation of reliability of the recording and/or reproducing device. In addition, the leader pin is wound with the fee end area of the magnetic tape. As a result, on attaching/detaching the leader pin to/from the grabber, the tip portion of the locking element rubs with respect to the winding portion of the magnetic tape. Therefore, during repetition of the attaching/detaching operation, it is feared that the area of the free end of the magnetic tape wound on the leader pin peels from the leader pin. In addition, inasmuch as the attaching/detaching operation is repeated with the leader pin rubbed with the tip portion of the locking element, the tip portion of the locking element is worn down. As a result, it is feared that holding force of the locking element with respect to the leader pin degrades and it results in degradation of reliability in the recording and/or reproducing device.

SUMMARY OF THE INVENTION

It is therefore an object of the present invention to provide a recording and/or reproducing device comprising a retaining mechanism which is capable of stably attaching/detaching a leader pin to/from a grabber without loading the leader pin on attaching/detaching the leader pin to/from the grabber.

It is another object of the present invention to provide a recording and/or reproducing device comprising a retaining mechanism which is capable of preventing a wound portion of a magnetic tape from peeling from the leader pin.

It is still another object of the present invention to a recording and/or reproducing device comprising a retaining mechanism which is capable of preventing retaining parts for making the leader pin retain to the grabber from wearing.

Other objects of this invention will become clear as the description proceeds.

According to one aspect of the present invention, a recording and/or reproducing device, into which a cartridge can be loaded, includes a single take-up reel for taking up a magnetic tape accommodated in the cartridge. The cartridge accommodates the magnetic tape and a leader pin connected to an end portion of the magnetic tape. The recording and/or reproducing device includes a grabber coupled to the take-up reel via a leader tape and a grabber holder for holding the grabber while attaching the grabber to and detaching the grabber from the leader pin. The grabber and the leader pin form a pull-out assembly when the grabber is coupled to the leader pin. According to this aspect of the present invention, the recording and/or reproducing device includes a locking member for locking the leader pin during movement of the pull-out assembly between the grabber holder and the take-up reel. The locking member is movable between a retracted position where the leader pin is not locked and a locking position where the leader pin is locked. A releasing arrangement makes the locking member retract to the retracted position when the grabber comes close to the cartridge. The releasing arrangement makes the locking member move to the locking position when the grabber moves away from the cartridge.

In the above-mentioned recording and/or reproducing device, the recording and/or reproducing device preferably may further comprise an urging arrangement for urging the locking member toward the locking position. In this event, the releasing arrangement may make the locking member retract to the retracted position opposed to urging force of the urging arrangement when the grabber comes close to the cartridge. In addition, the recording and/or reproducing device may further comprise a chassis and the grabber may comprise a grabber body. The grabber may preferably be rotatably and slidably mounted on said chassis. The locking member may preferably be mounted in the grabber body movably in a horizontal direction. In this event, the releasing arrangement may comprise a first releasing arm, rotatably mounted to the grabber body, for engaging to the locking member and a second releasing arm, rotatably mounted on the grabber holder, for rotatably moving the first releasing arm with interlocked to a sliding operation of the grabber holder. The recording and/or reproducing device further may comprise a sliding mechanism for making the grabber holder slide on the chassis.

DESCRIPTION OF THE PREFERRED EMBODIMENT

Figure 1:
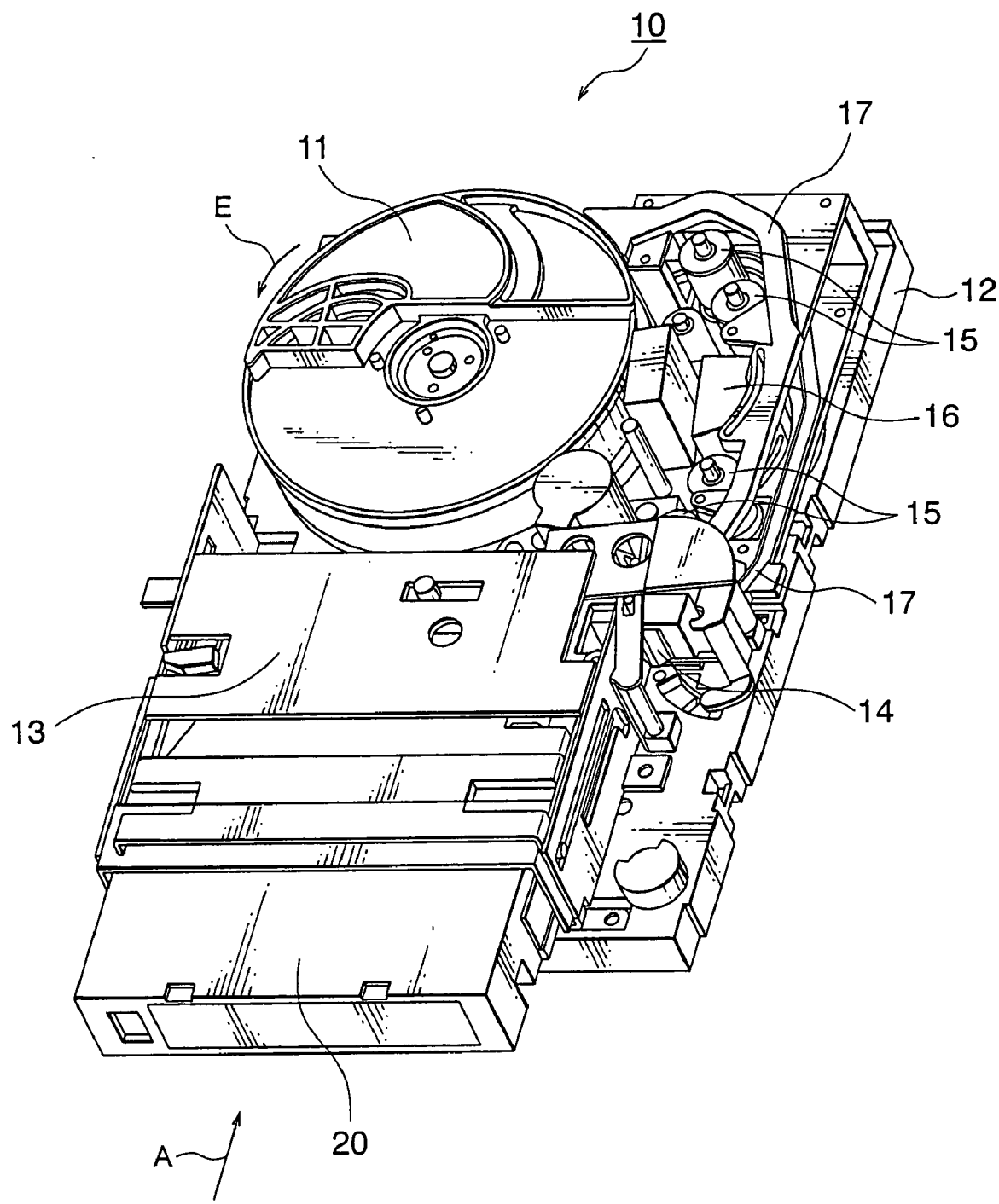
FIG. 1 is a plan view showing a tape drive serving as a recording and/or reproducing device to which this invention is applicable with an upper cover removed therefrom.

Referring to FIG. 1, the description will proceed to a tape drive 10 serving as a recording and/or reproducing device to which this invention is applicable. FIG. 1 is a plan view showing the tape drive 10 with an upper cover removed therefrom.

The tape drive 10 is for receiving a cartridge 20 and contains a take-up reel 11 inside thereof. The take-up reel 11 is also called a spool. The tape drive 10 is generally comprised of a rectangular housing (chassis) 12 that has a common base. The base has first and second spindle motors (reel motors) (not shown). The first spindle motor has the spool (or the take-up reel) 11 permanently mounted on the base of the housing 12 and the spool 11 is dimensioned to accept a relatively high speed streaming magnetic tape (which will later be described). The second spindle motor (reel motor) is adapted to accept the removable cartridge 20. The removable cartridge 20 is inserted into the tape drive 10 via a lift 13 formed on the housing 12 of the tape drive 10 along an insertion direction depicted at an arrow A.

Upon insertion of the cartridge 20 into the lift 13, the cartridge 20 engages the second spindle motor (the supply reel motor). Prior to rotation of the first and the second spindle motors (reel motors), the cartridge 20 is connected to the permanently mounted spool (the take-up reel) 11 by means of a connection between a grabber 14 and a leader pin (which will later be described). A number of rollers (guide rollers) 15 positioned intermediate the cartridge 20 and the permanent spool 11 guide the magnetic tape as it traverses at relatively high speeds back and forth between the cartridge 20 and the permanently mounted spool 11.

The tape drive 10 further comprises a head actuator assembly 16. The head actuator 16 is located between the take-up spool 11 and the cartridge 20 on a tape-transport path (not shown) defined by the above-mentioned plurality of rollers 15. During operation, the magnetic tape flows forward and backward between the take-up spool 11 and the cartridge 20 and is closely adjacent to the head actuator 16 while the magnetic tape flows on the defined tape-transport path.

Referring to FIGS. 2 through 5, the cartridge 20 has an access opening 21a in a right-hand side wall 21 thereof. The access opening 21a can be opened and closed by means of a shutter which is not shown. The shutter is brought automatically in its open position when the cartridge 20 is loaded into the tape drive 10.

The cartridge 20 accommodates a rotationally drivable supply reel (not shown). The cartridge 20 further accommodates a magnetic tape 22 wound on a reel hub of the supply reel. The cartridge 20 includes the leader pin 23 connected to the magnetic tape 22 at the free end portion of the magnetic tape 22. In the cartridge 20, the leader pin 23 is held in a coupling position by means of two positioning forks 24.

Referring to FIGS. 6A, 6B, 7A, and 7B, in order to enable the grabber 14 to be coupled to the leader pin 23, the tape drive 10 includes a grabber holder 30 adapted to detachably hold the grabber 14. The grabber holder 30 is rotatably mounted on chassis 12 around a pivotal axis 301 and is slidably mounted on the chassis 12 in a horizontal direction.

Figures 6A, 6B:
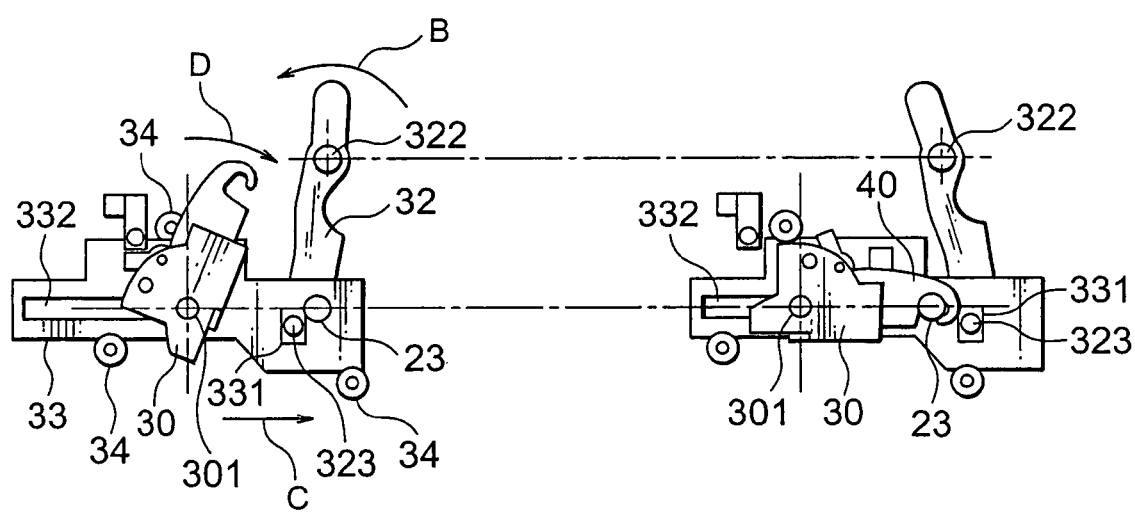
FIG. 6A is a plan view showing a standby state where a cartridge is loaded in the tape drive.
FIG. 6B is a plan view showing an operating state where the grabber chucks the leader pin by rotating a grabber holder.
Figures 7A, 7B:
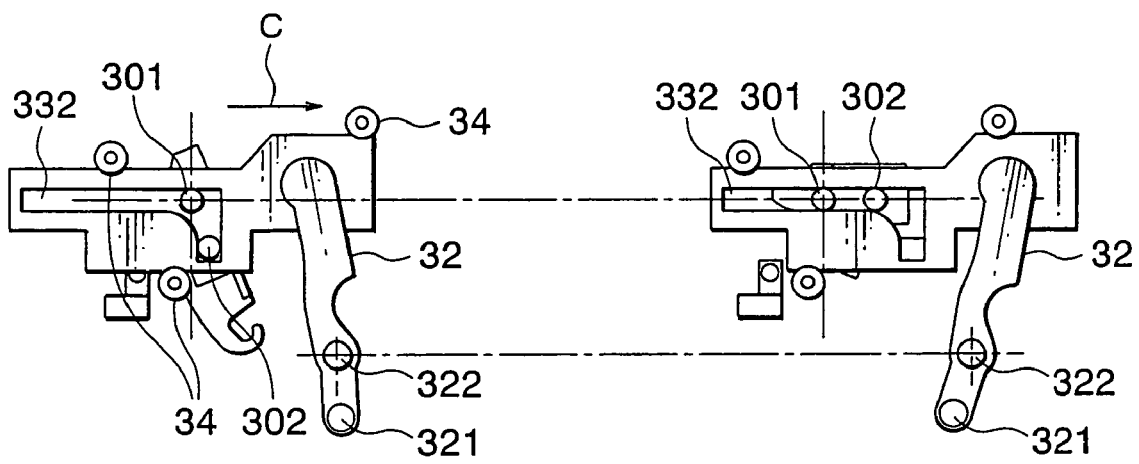
FIG. 7A is a bottom view showing the standby state where the cartridge is loaded in the tape drive.
FIG. 7B is a bottom view showing the operating state where the grabber chucks the leader pin by rotating the grabber holder.

FIGS. 6A and 7A are a plan view and a bottom view showing a standby state of the grabber holder 30 where the cartridge 20 is loaded in the tape drive 10, respectively. FIGS. 6B and 7B are a plan view and a bottom view showing an operating state of the grabber holder 30 where the grabber 14 chucks the leader pin 23 by rotating the grabber holder 30, respectively.

The grabber holder 30 is movable between a standby position shown in FIGS. 6A and 7A and an operating position shown in FIGS. 6B and 7B. A movement of the grabber holder 30 into the operating position causes a movement of the grabber 14 in a coupling direction and causes the grabber 14 and the leader pin 23 to be coupled. A movement of the grabber holder 30 out of the operating position causes a movement of the grabber 14 in a direction opposite to the coupling direction and causes the grabber 14 and the leader pin 23 to be disengaged.

In order to move the grabber holder 30, the tape drive 10 comprises a cam gear 31 (FIG. 2), an arm 32, and a cam slider 33. The cam gear 31 is rotatably driven around its central axis by a motor which is not shown. The cam gear 31 has a cam groove (not shown) in which a first engagement pin 321 provided at an end portion of the arm 32 is inserted. In addition, the arm 32 is mounted on the chassis 12 so as to be pivotable about a pivotal axis 322. The arm 32 has another end portion provided with a second engagement pin 323 which is inserted in an engagement hole 331 of the cam slider 33. The cam slider 33 is movably held in a predetermined direction by three cam slider rollers 34 which are rotatably mounted on the chassis 12. In other words, the cam slider rollers 34 define a movement direction of the cam slider 33. The cam slider 33 has an L-shaped slider opening 332. In the slider opening 332, an engagement projection 302 projecting from a lower end of the grabber holder 30 is inserted.

Referring now to FIGS. 6A through 7B, description will be made as regards operation in a case of chucking the leader pin 23 by the grabber 14 by rotating the grabber holder 30.

When the cam gear 31 rotates, the arm 32 rotates about the pivotal axis 322 in a counterclockwise direction, as shown at an arrow B in FIG. 6A. A rotation of the arm 32 in the counterclockwise direction causes to a movement of the cam slider 33 in a direction as shown at an arrow C in FIG. 6A. When the cam slider 33 moves, the engagement projection 302 of the grabber holder 30 moves along the slider opening 332 of the cam slider 33, as shown in FIG. 7B. Therefore, the grabber holder 30 rotates around the pivotal axis 301 in a clockwise direction, as shown at an arrow D in FIG. 6A. A rotation of the grabber holder 30 causes to a rotation of the grabber 14 held in the grabber holder 30 and then the grabber 14 chucks the leader pin 23, as shown in FIG. 6B.

In order to enable the grabber 14 and the leader pin 23, after they have been coupled, i.e. a pull-out assembly 40 (FIG. 3) thus formed, to be moved away from the grabber holder 30 and to be moved up to the reel hub of the take-up reel 11, the tape drive 10 includes a leader tape (which will later be described). The leader tape is guided along the tape-transport path. The tape-transport path is defined by the above-mentioned rollers 15.

The leader tape has one end connected to the grabber 14 and has its other end connected to the reel hub of the take-up reel 11. Thus, by driving the take-up reel 11 in a taking-up direction indicated by an arrow E in FIG. 1 by a reel motor (not shown), the pull-out assembly 40 can be moved away from the grabber holder 30 and up to the reel hub of the take-up reel 11 with the aid of the leader tape. In this event, at the reel hub of the take-up reel 11, the reel hub and the pull-out assembly 40 are brought to each other.

During the movement of the pull-out assembly 40 away from the grabber holder 30 and towards the reel hub of the take-up reel 11 and also during the movement in the opposite direction, the pull-out assembly 40 should be moved without contact past the rollers 15 and past the magnetic head of the head assembly 16. Therefore, the tape drive 10 comprises a pair of rails 17 which extend essentially adjacent the tape-transport path and which, in the width direction of the magnetic tape 22, are spaced apart by a distance larger than the width of the magnetic tape 22.

Figure 8:
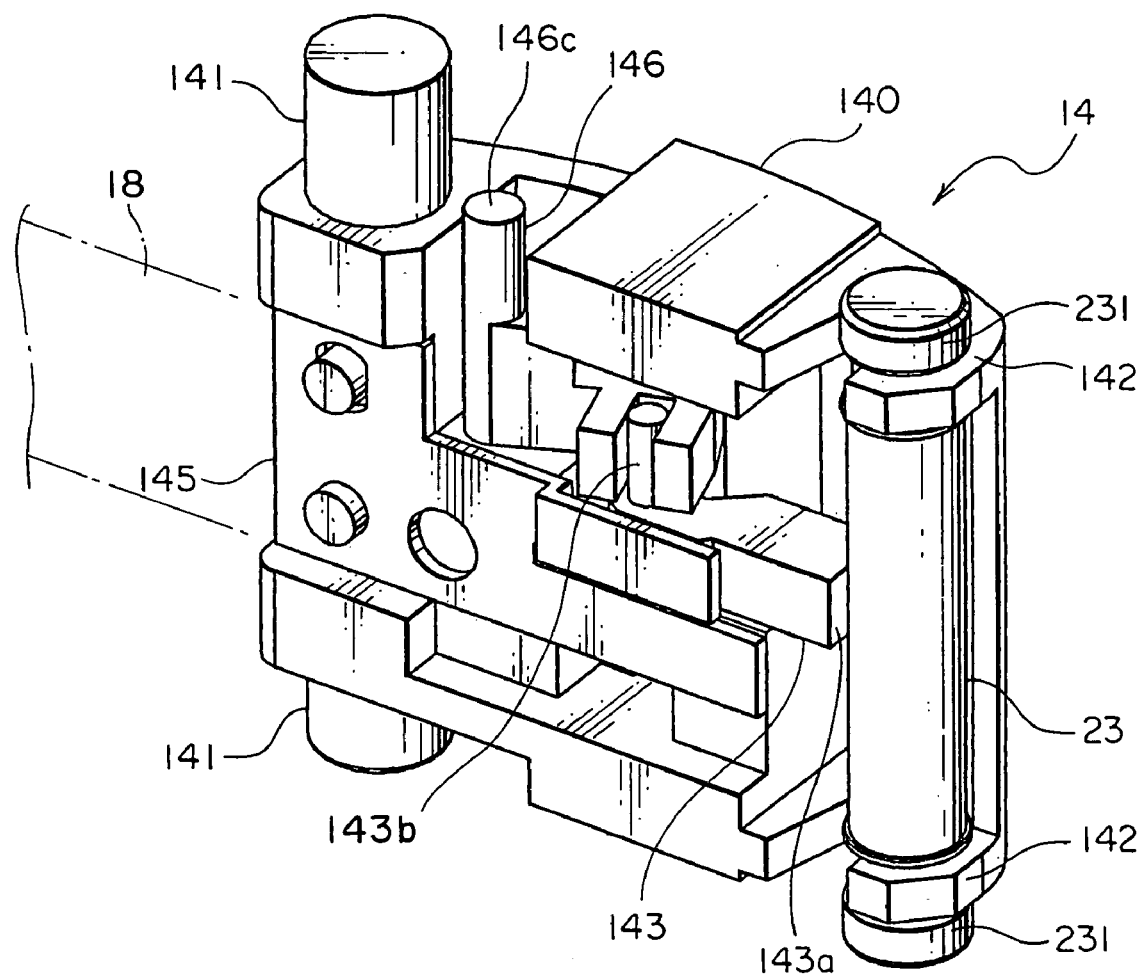
FIG. 8 is a perspective view showing the grabber according to an embodiment of this invention with the leader pin is inserted in the grabber.
Figure 9:
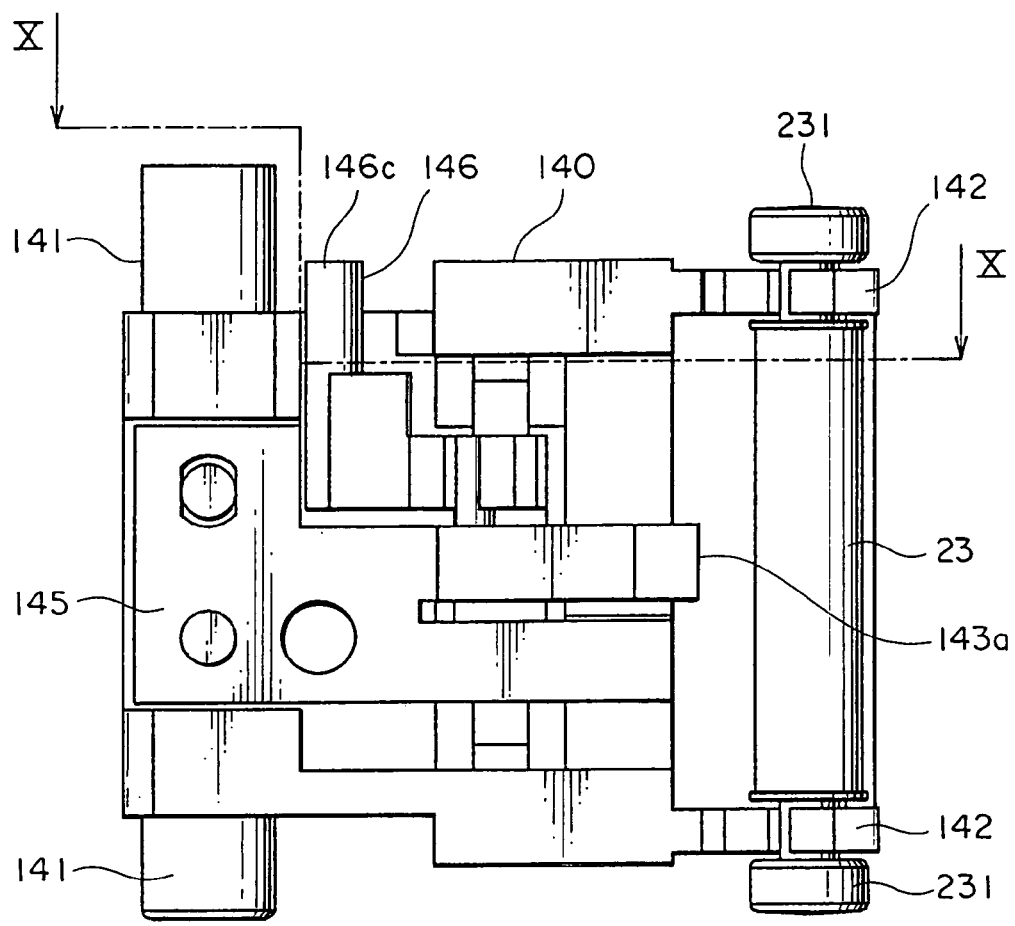
FIG. 9 is a front view of the grabber showing a state where the leader pin is released.
Figure 10:
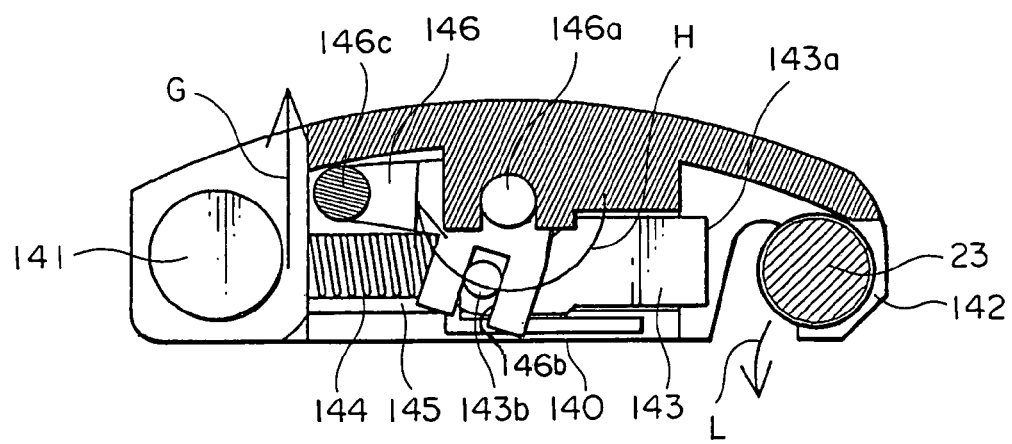
FIG. 10 is a cross sectional view taken on line X—X of FIG. 9.
Figure 11:
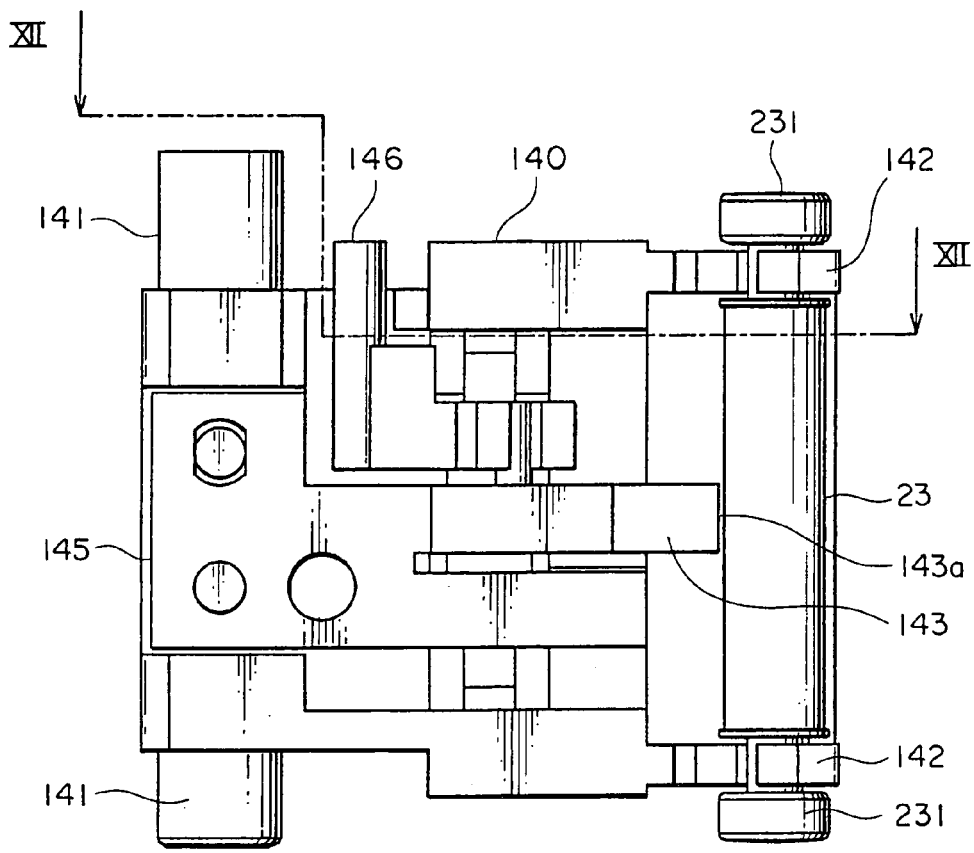
FIG. 11 is a front view of the grabber showing a state where the leader is held.
Figure 12:
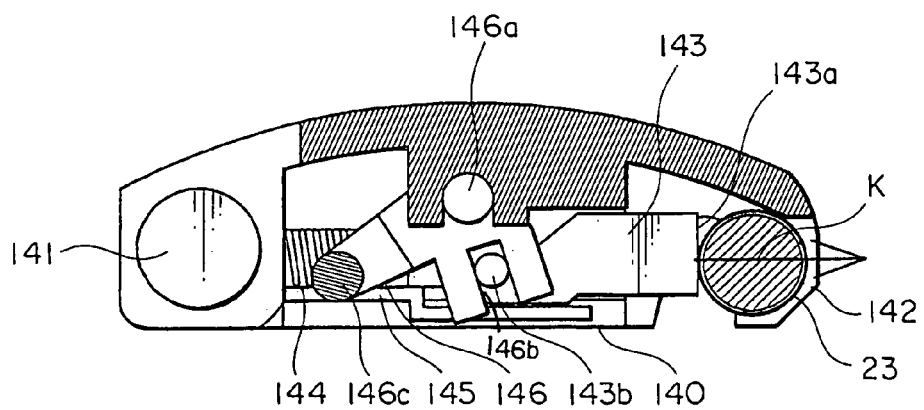
FIG. 12 is a cross sectional view taken on line XII—XII of FIG. 11.

Referring to FIGS. 8 through 12, the description will proceed to the grabber 14 to which this invention is applicable. FIG. 8 is a assembled perspective view of the grabber 14. FIG. 9 is a front view of the grabber 14 showing a state where the leader pin 23 is released and FIG. 10 is a cross-sectional view taken on line X—X of FIG. 9. FIG. 11 is a front view of the grabber 14 showing a state where the leader pin 23 is held and FIG. 12 is a cross-sectional view taken on line XII—XII of FIG. 11.

The grabber 14 comprises a grabber body 140 and has a pair of end portions 141 at one side of the grabber body 140. The pair of end portions 141 engages in guide channels of the above-mentioned pair of rails 17. In addition, the grabber 14 has a pair of hook portions 142 at another side of the grabber body 140. The pair of hook portions 142 is for hooking the above-mentioned leader pin 23.

On the other hand, the leader pin 23 has a pair of end portions 231 at upper and lower ends thereof. The pair of end portions 231 is engaged with the guide channels of the pair of rails 17 with the leader pin 23 coupled to the grabber 14.

During the movement of the pull-out assembly 40 away from the grabber holder 30 and towards the reel hub of the take-up reel 11, it is important that the grabber 14 and the leader pin 23 are held to each other in an interlocked state.

In order to guarantee this interlocking, the grabber 14 according to this embodiment comprises a pin retainer (a locking member) for retaining (locking) the leader pin 23 only during the movement of the above-mentioned pull-out assembly 40. The pin retainer (the locking member) 143 is always urged by a spring 144 in a direction to retain (lock) the leader pin 23. In other words, the spring 144 serves as an urging arrangement for urging the pin retainer (the locking member) 143 toward a locking position for locking the leader pin 23. The pin retainer 143 and the spring 144 is movable (slidable) in a movement (sliding) direction which is defined by a retainer plate 145. In addition, the retainer plate 145 fixes the above-mentioned leader tape 18.

In the grabber body 140, a first releasing arm 146 is rotatably mounted. Specifically, the first releasing arm 146 is mounted in the grabber body 140 so as to be pivotable about a pivotal axis 146a which extends up and down. The pin retainer 143 has an engagement projection 143b projecting upward at an end opposed to a tip portion 143a. The first releasing arm 146 has an engagement notch 146b engaged with the engagement projection 143b. In addition, the first releasing arm 146 has an engagement pin 146c extending upward at a position apart from the pivotal axis 146a. The engagement pin 146c is engaged with an engagement piece of a second releasing arm which will later be described.

Figure 13:
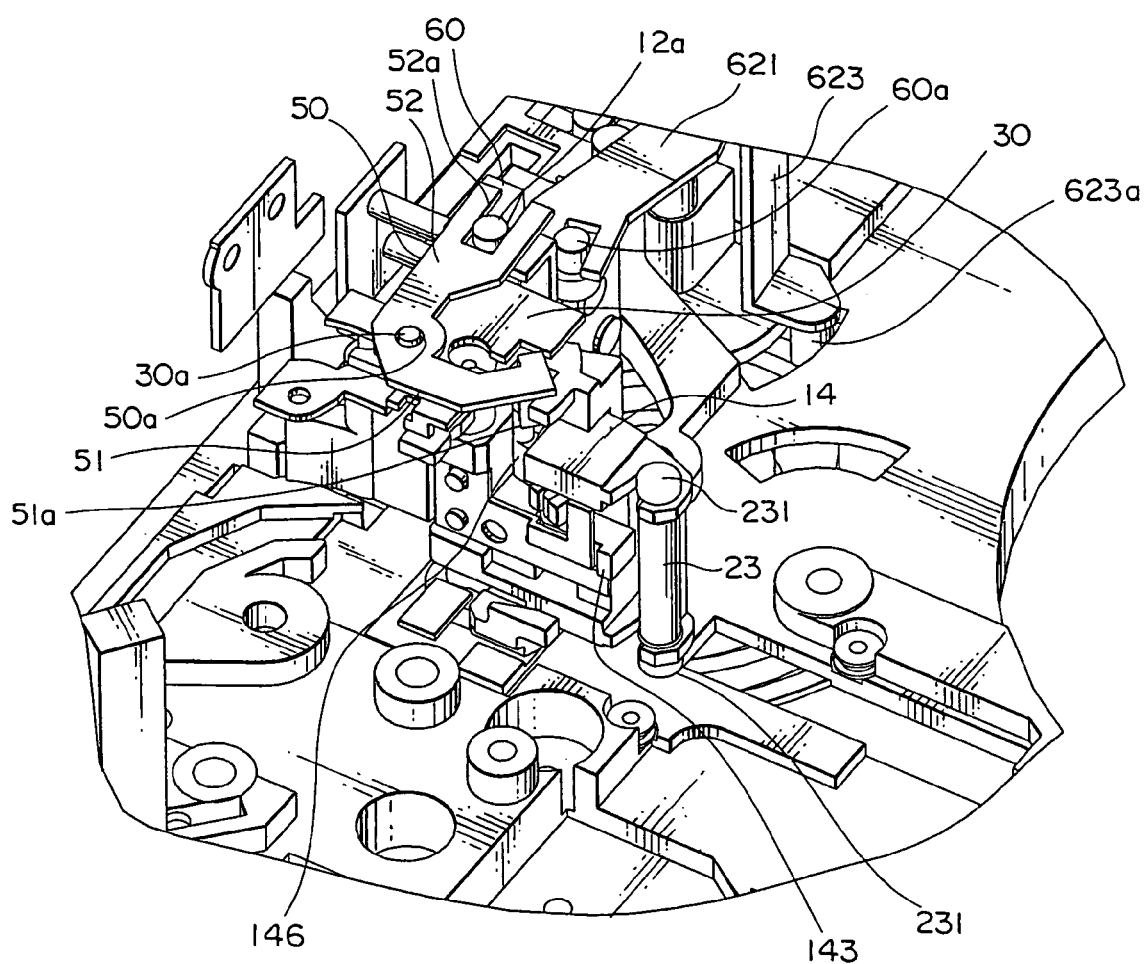
FIG. 13 is a perspective view of a main part of the tape drive illustrated in FIG. 3.
Figure 14:
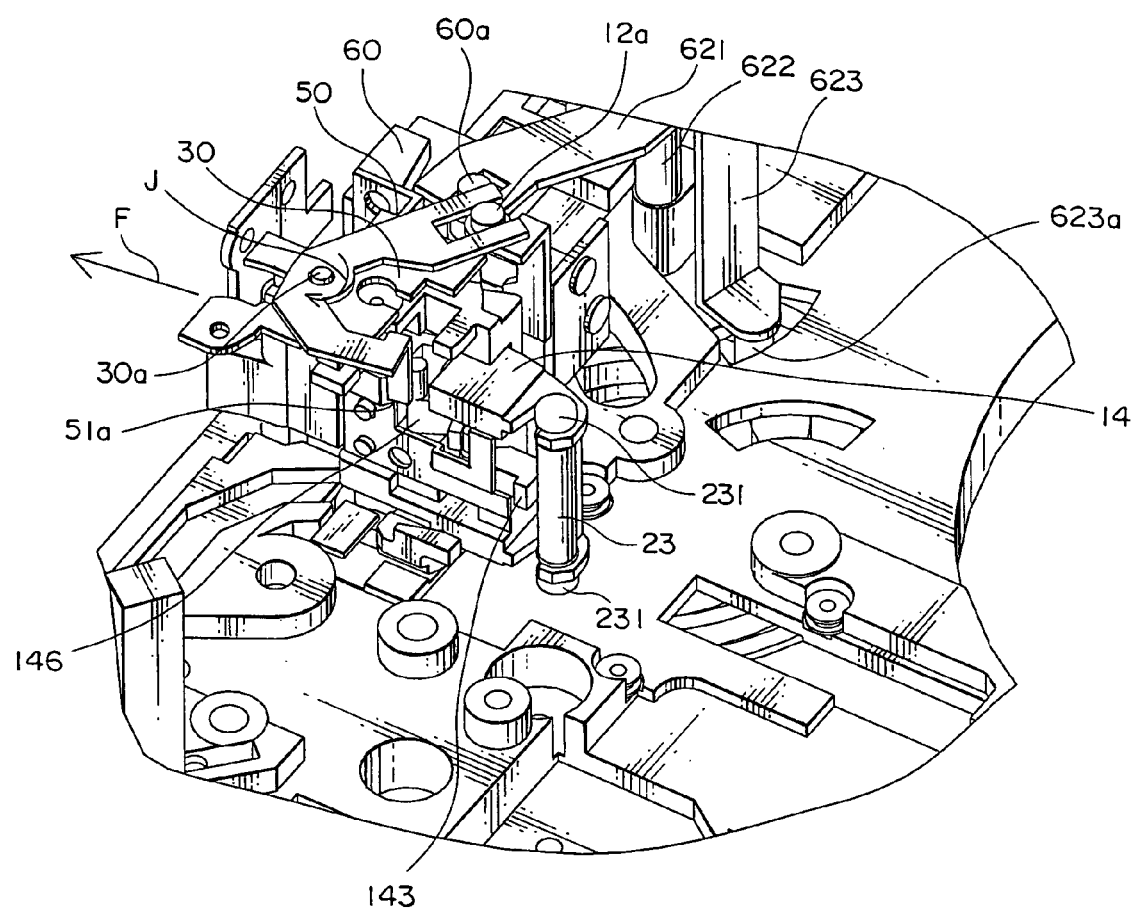
FIG. 14 is a perspective view of the main part of the tape drive illustrated in FIG. 4.

Referring to FIGS. 13 and 14, the description will proceed to the second releasing arm 50 which is engaged with the first releasing arm 146. FIG. 13 is a perspective view of a main portion of the tape drive 10 showing a state where the grabber 14 grabs the leader pin 23. FIG. 14 is a perspective view of the main portion of the tape drive 10 showing a state where the grabber 14 is slid.

The second releasing arm 50 is rotatably mounted on the grabber holder 30. Specifically, the grabber holder 30 has a columnar protrusion 30a for protruding from an upper surface thereof upwards. The second releasing arm 50 is mounted so as to be pivotable about the columnar protrusion 30a. The second releasing arm 50 has a circular hole 50a in which the columnar protrusion 30a is inserted. The second releasing arm 50 has first and second arms 51 and 52 extending from the circular hole 50a perpendicular to each other in a horizontal direction. The first arm 51 has a tip which is provided with the engagement piece 51a extending downwards. The engagement piece 51a is engaged with the engagement pin 156c of the above-mentioned first releasing arm 146 in the manner which is described above. The second arm 52 has a tip in which an engagement notch 52a is formed. The engagement notch 52a is engaged with a fixed pin 12a which is fixedly mounted on the chassis 12.

Figure 15:
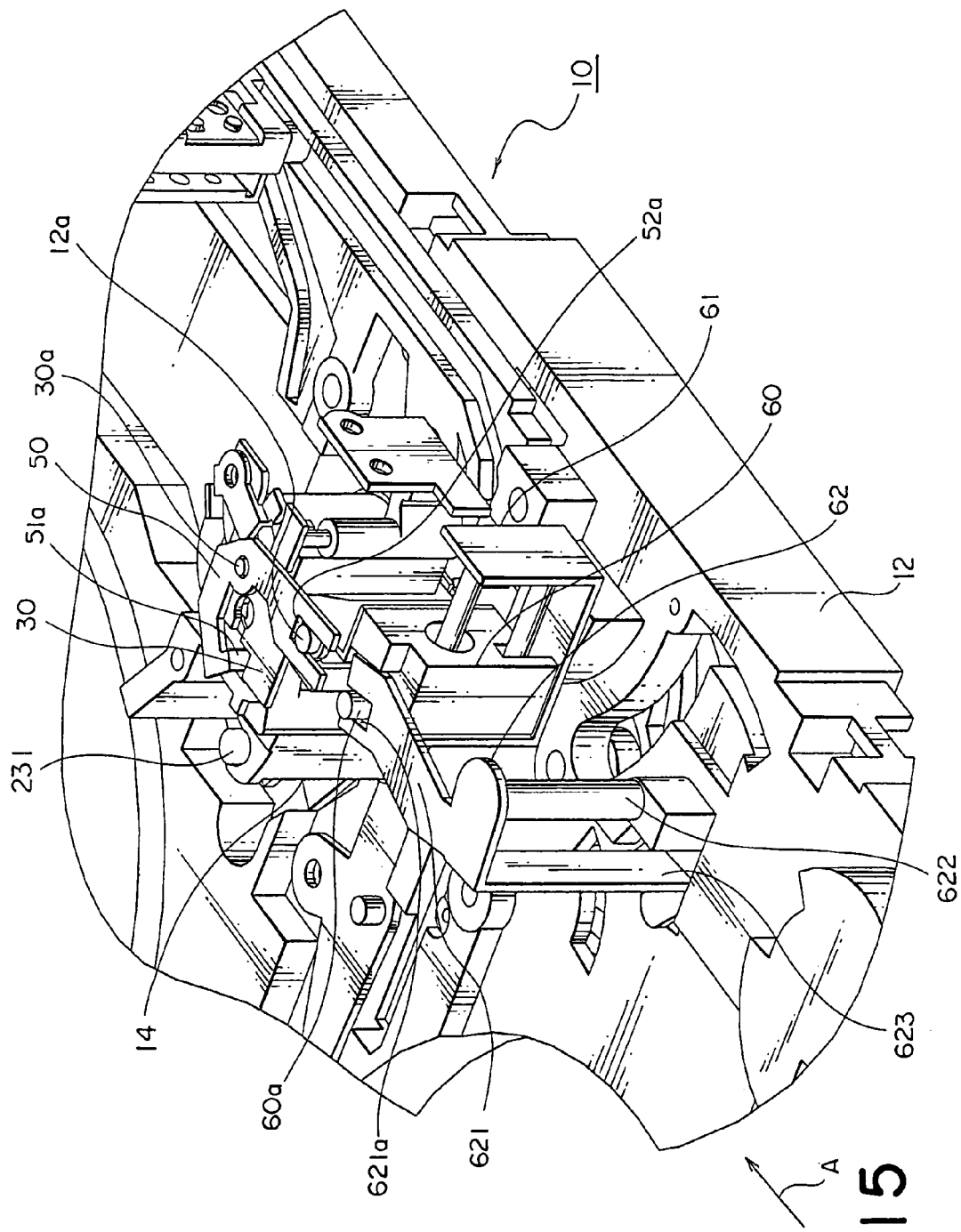
FIG. 15 is a fragmentary enlarged perspective view of the tape drive illustrated in FIG. 3.
Figure 16:
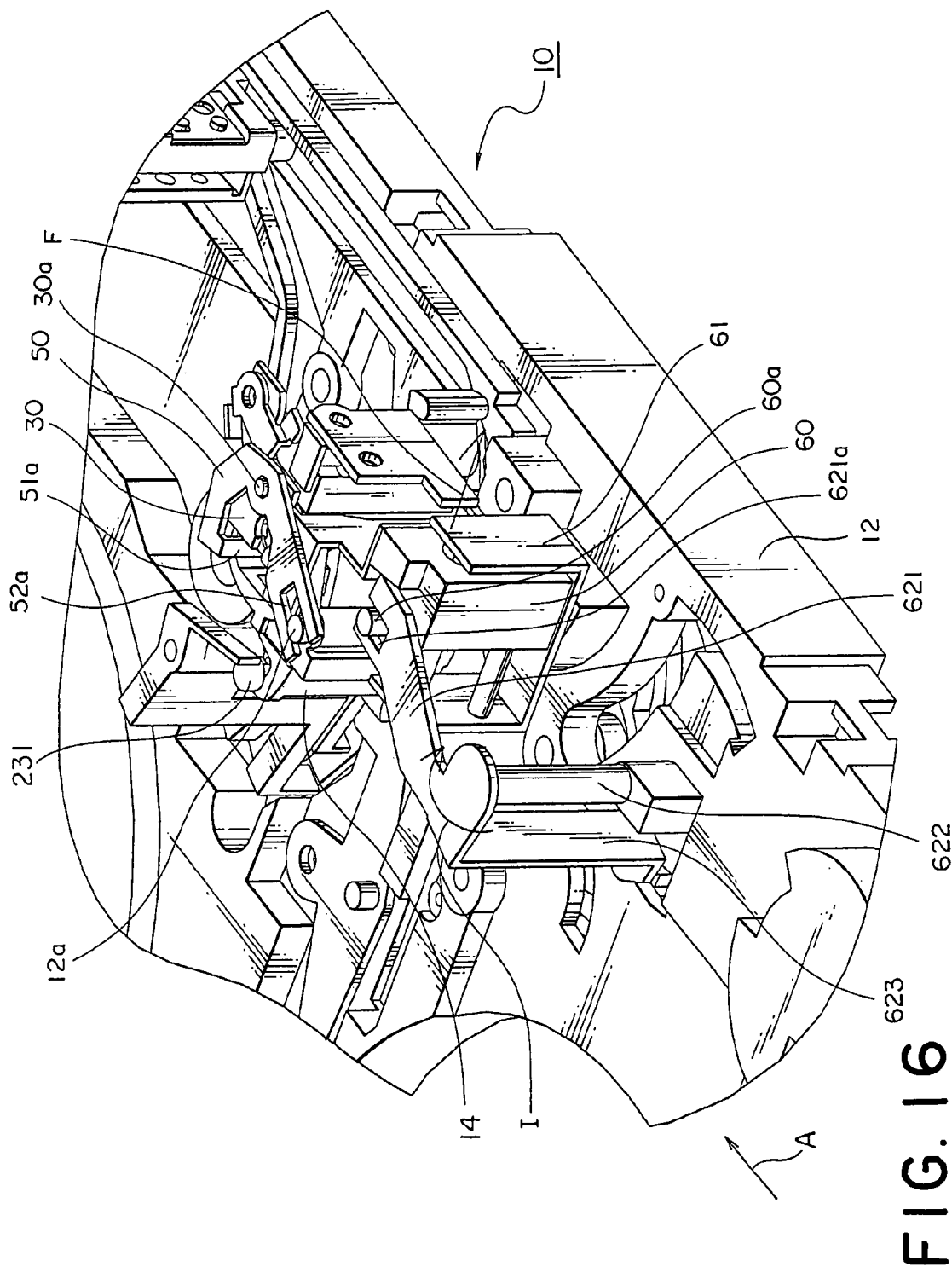
FIG. 16 is a fragmentary enlarged perspective view of the tape drive illustrated in FIG. 4.

The grabber holder 30 for holding the grabber 14 is slid by a sliding mechanism which will presently be described. Referring now to FIGS. 15 and 16, the description will proceed to the sliding mechanism for making the grabber holder 30 slide. FIG. 15 shows a state before the grabber holder 30 is slid while FIG. 16 shows a state after the grabber holder 30 is slid.

The sliding mechanism comprises a grabber stand 60 for fixing the grabber holder 30. The grabber stand 60 is mounted on a guide 61 so as to be slidable in a sliding direction. The grabber stand 60 has an engagement protrusion 60a for protruding from an upper surface thereof upwards. The sliding mechanism comprises an arm member 62 for making the grabber stand 60 move along the guide 61 in the sliding direction. The arm member 62 comprises a horizontal arm 621 extending in a horizontal direction. The horizontal arm 621 has a tip in which an engagement notch 621a is formed. The engagement protrusion 60a is engaged with the engagement notch 621a. The arm member 62 is mounted on the chassis 12 so as to be pivotable about a pivotal axis 622 thereof. The arm member 62 has a vertical arm 623 extending in a vertical direction. The vertical arm 623 has a lower end which is provided with an engagement pin 623a (see FIGS. 13 and 14). The engagement pin 623a is engaged with a cam groove (not shown) of the cam gear 31 which is provided in a lower surface of the chassis 12.

Figure 2:
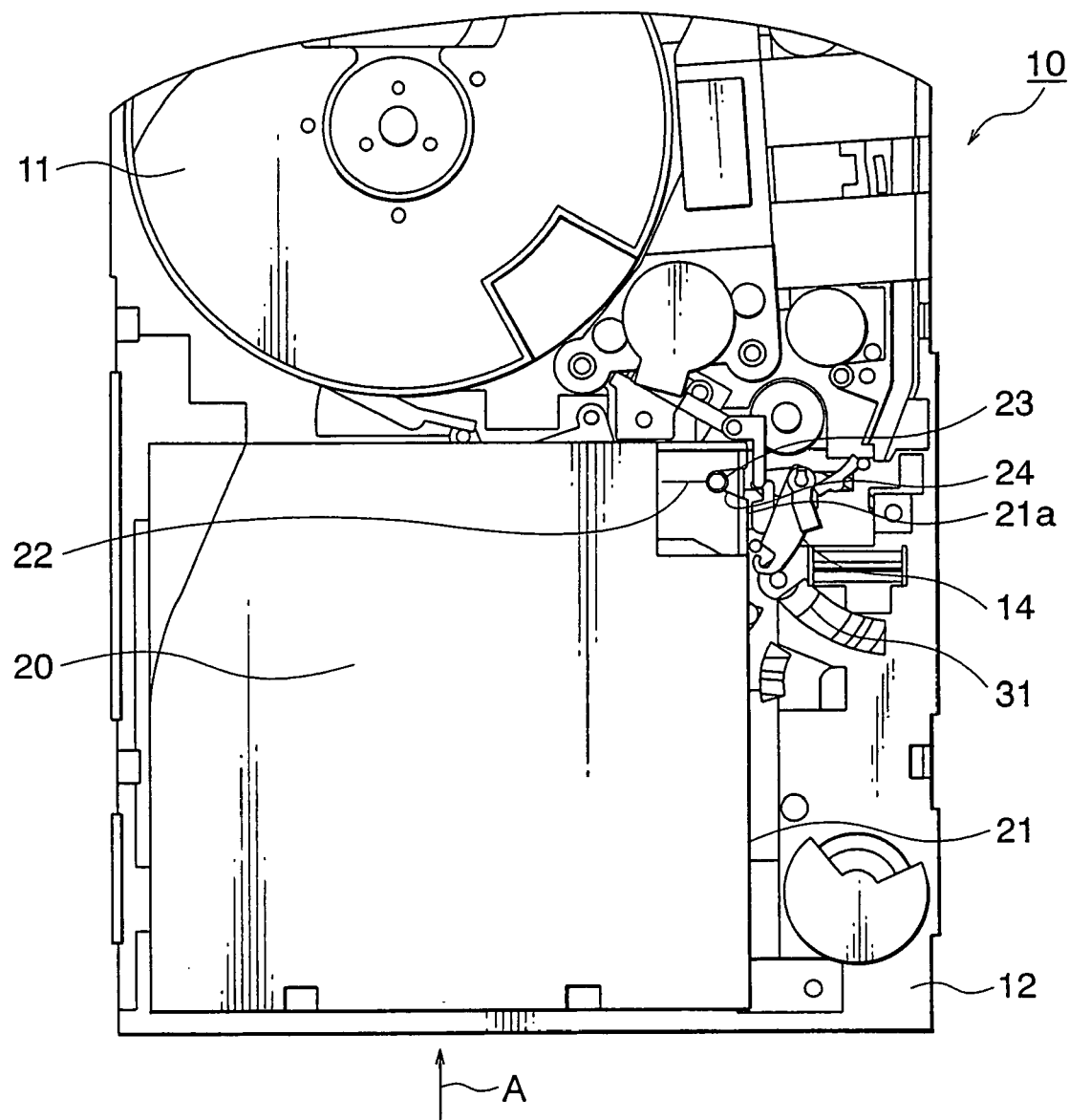
FIG. 2 is a plan view showing the tape drive before a leader pin is grabbed by a grabber.
Figure 3:
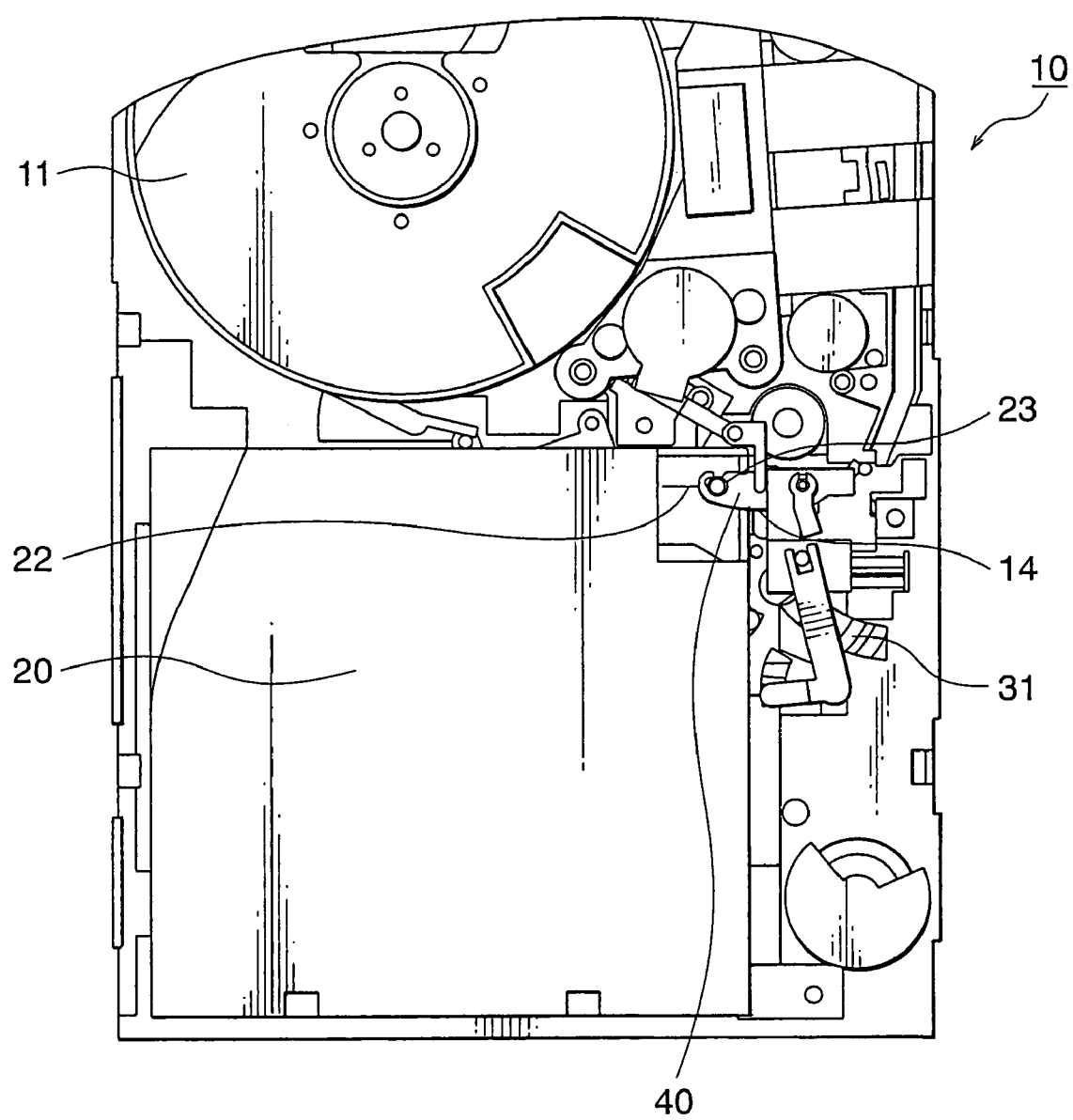
FIG. 3 is a plan view showing the tape drive when the leader pin is grabbed by the grabber.
Figure 4:
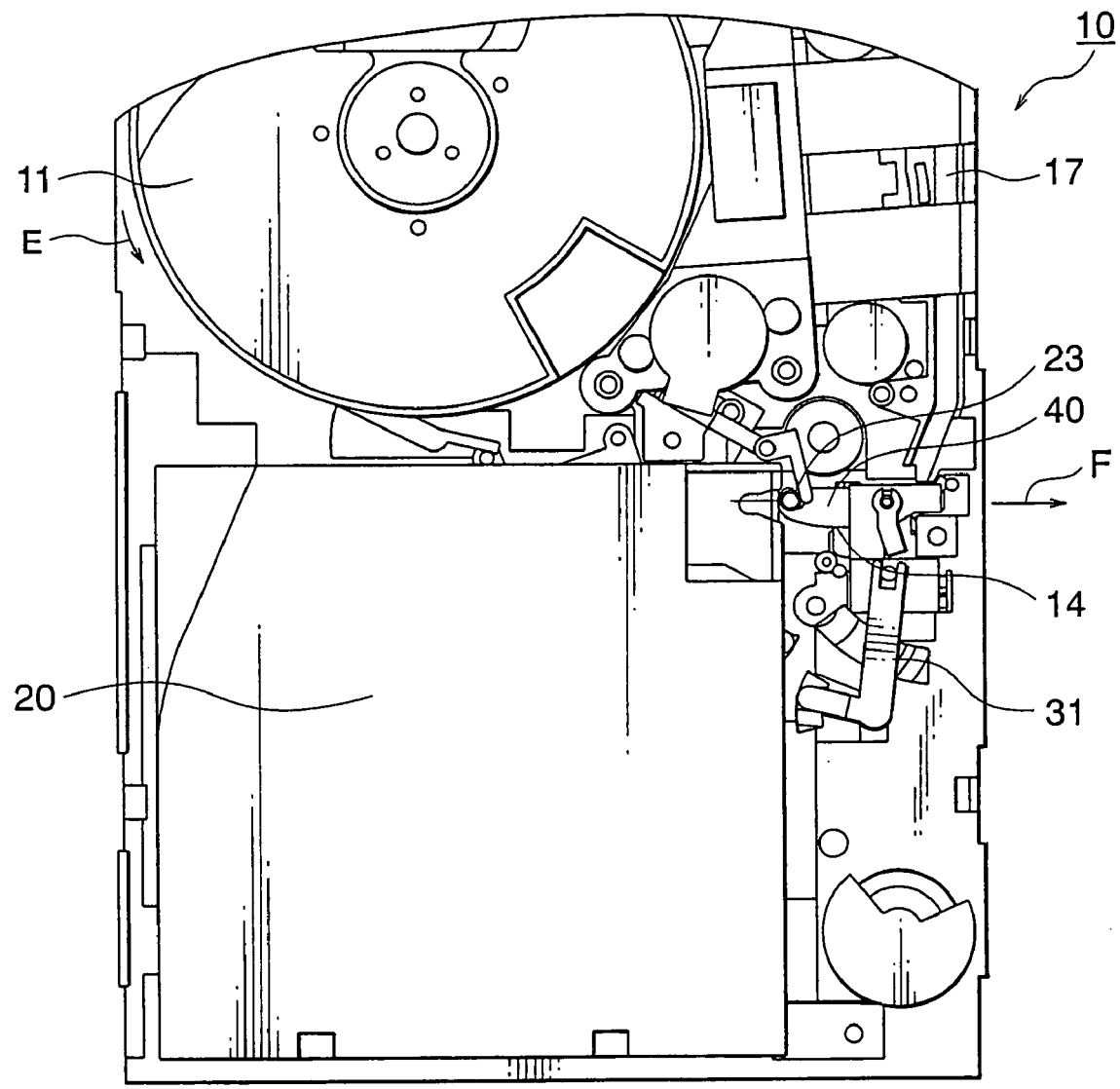
FIG. 4 is a plan view showing the tape drive including a pull-out assembly where the leader pin is fixed to the grabber.
Figure 5:
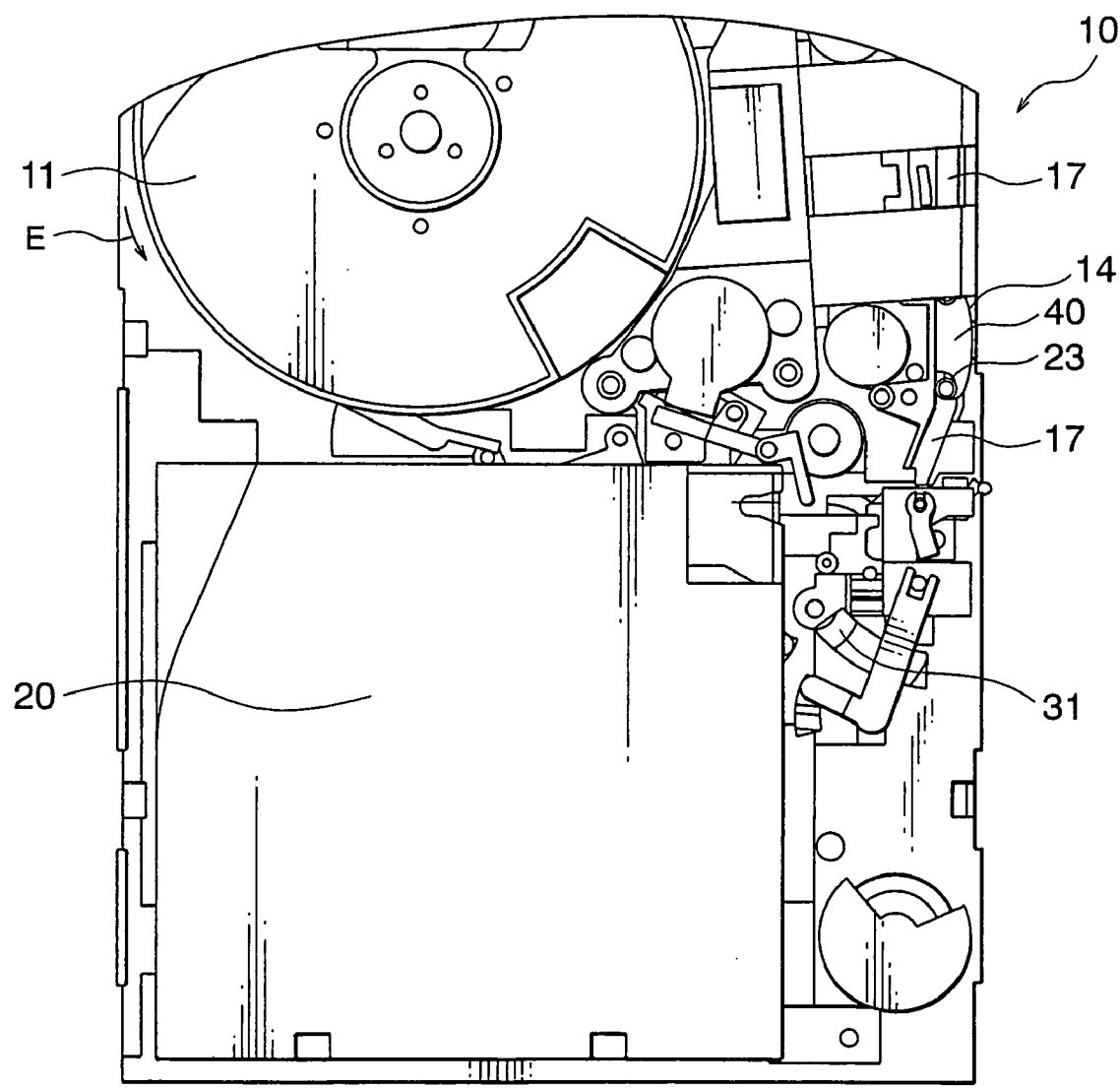
FIG. 5 is a plan view showing the tape drive when the pull-out assembly is moved toward a take-up reel.

Referring to FIGS. 1 through 16, the description will be made as regards operation of the retaining mechanism according to this embodiment. FIG. 2 is a plan view showing the tape drive 10 before the leader pin 23 is grabbed by the grabber 14. FIG. 3 is a plan view showing the tape drive 10 when the leader pin 23 is grabbed by the grabber 14. FIG. 4 is a plan view showing the tape drive 10 including the pull-out assembly 40 where the leader pin 23 is fixed to the grabber 14. FIG. 5 is a plan view showing the tape drive 10 when the pull-out assembly 40 is moved towards the take-up reel 11.

At first, referring to FIG. 2, the description will proceed to a state before the leader pin 23 is grabbed by the grabber 14. The spring 14 always urges the pin retainer (the locking member) 143 in the direction to hold the leader pin 23 (i.e. toward the locking position). However, in this event, the engagement piece 51a of the second releasing arm 50 is engaged with the engagement pin 146c of the first releasing arm 146 and the engagement pin 146c is affected by arm releasing force as shown at an arrow G in FIG. 10. As a result, the first releasing arm 146 is put into a position where the first releasing arm 146 is rotated in the clockwise direction, as shown in an arrow H in FIG. 10. Accordingly, opposite to the urging force of the spring 144, the pin retainer 143 is retracted to the retracted position (a non-holding position). That is, the pin retainer 143 is put into a position apart from the leader pin 23.

In this state, by rotating the cam gear 31, the grabber 14 rotates clockwise, as shown in the arrow D in FIG. 6A.

Therefore, the leader pin 23 is hooked by the pair of hook portions 142 of the grabber 14, as shown in FIGS. 3, 9, 10, and 13. Inasmuch as the engagement piece 51a of the second releasing arm 50 is engaged with the engagement pin 146c of the first releasing arm 146 in this event as shown in FIGS. 10 and 13, the leader pin 23 is smoothly inserted in the grabber 14 without rubbing the tip portion 143a of the pin retainer 143.

It is therefore possible to prevent the free end area of the magnetic tape 22 wound around the leader pin 23 from peeling from the leader pin 23 and to prevent the tip portion 143a of the pin retainer 143 from being worn down as prior art. Accordingly, it is possible to improve reliability of the tape drive 10. In this event, the grabber stand 60 is put into a state before being slid, as shown in FIG. 15.

By further rotating the cam gear 31 from this state, the engagement pin 623a of the arm member 62, which is engaged with the cam groove thereof, moves along the cam groove. As a result, the arm member 62 rotates around the pivotal axis 622 in the clockwise direction, as shown in an arrow I in FIG. 16. Consequently, the grabber stand 60 having the engagement protrusion 60a engaged with the engagement notch 621a of the arm member 62 slides along the guide 61 in the direction to be apart from the cartridge 20, as shown in the arrow F in FIG. 16. It is therefore possible to make the grabber 14 move in the direction to be apart from the cartridge 20, as shown in the arrow F in FIG. 4.

Simultaneously, as shown in FIG. 14, as the grabber stand 60 moves in the direction depicted at the arrow F, the second releasing arm 50 rotates around the columnar projection 30a in the clockwise direction, as shown at an arrow J. This is because the engagement notch 52a of the second releasing arm 50 is engaged with the fixed pin 12a. As a result, engagement between the engagement piece 51a of the second releasing arm 50 and the engagement pin 146c of the first releasing arm 146 is released and the urging force of the spring 44 causes to move the pin retainer 143 in the direction which comes close to the leader pin 23, as shown in an arrow K in FIG. 12. Therefore, as shown in FIG. 11, the tip portion 143a of the pin retainer 143 is opposed to the leader pin 23 apart from to each other by a short distance. As a result, the leader pin 23 is fixed (locked) to the grabber 14 to form the pull-out assembly 40 and it is possible to prevent the leader pin 23 from breaking away from the grabber 14.

Thereafter, by driving the reel motor for rotatably driving the take-up reel 11 to make the take-up reel 11 rotate in the take-up direction E, the pull-out assembly 40 where the grabber 14 and the leader pin 23 are coupled to each other moves along the rails 17 in the direction to come close to the take-up reel 11 to be united with the reel hub of the take-up reel 11. With this state, on the reel hub of the take-up reel 11, the magnetic tape 22 is wound. Now, the description will be made as regards operation in a case of rewinding the magnetic tape 22 from the take-up reel 11 to the supply reel in the cartridge 20.

In this event, by driving the reel motor for rotatably rotating the supply reel, the magnetic tape 22 is wound on the reel hub of the supply reel. Immediately before completion of rewinding of the magnetic tape 22, the pull-out assembly 40 is held in the grabber holder 30. This state is illustrated in FIGS. 14 and 16. In this state, the cam gear 31 is rotated in the opposite direction in the manner which is described above. Therefore, the grabber holder 30 (the grabber stand 60) slides in a direction to come close to the cartridge 20 that is the opposite direction with respect to the arrow F in FIGS. 14 and 16.

In this event, inasmuch as the second releasing arm 50 rotates around the columnar projection 30a in the counterclockwise direction which is the opposite direction with respect to the arrow J in FIG. 14, the engagement piece 51a of the second releasing arm 50 is engaged with the engagement pin 146c of the first releasing arm 146. As a result, as shown in the arrow G in FIG. 10, the engagement pin 146c of the first releasing arm 146 is affected by arm releasing force. Therefore, the first releasing arm 146 rotates around the pivotal axis 146a in the clockwise direction, as shown at the arrow H in FIG. 10. Inasmuch as the engagement notch 146b of the first releasing arm 146 is engaged with the engagement protrusion 143b of the pin retainer 143, the pin retainer 143 moves in the direction apart from the leader pin 23 opposed to the urging force of the spring 144. Therefore, as shown in FIGS. 10 and 11, the pin retainer 143 does not hold (lock) the leader pin 23. Consequently, as shown at the arrow L in FIG. 10, it is possible to easily release the leader pin 23 from the grabber 14 without loading the leader pin 23.

In the manner which is described above, inasmuch as the pin retainer 143 is located at the retracted position in the retaining mechanism according to the above-mentioned embodiment on attaching/detaching the leader pin 23 to/from the grabber 14, the tip portion 143a of the pin retainer 143 never rubs the leader pin 23. Therefore, large force is not required in order to attach/detach the leader pin 23 to/from the grabber 14. In other words, it is possible to easily attach/detach the leader pin 23 to/from the grabber 14 without loading the leader pin 23. As a result, it is possible to improve reliability of the tape drive 10. In addition, inasmuch as the tip portion 143a of the pin retainer 143 rubs the leader pin 23 on attaching/detaching the leader pin 23 to/from the grabber 14, it is possible to prevent the free end area of the magnetic tape 22 wound around the leader pin 23 from peeling from the leader pin 23 and to prevent the tip portion 143a of the pin retainer 143 from being worn down. It results in improving reliability of the tape drive 10.

While this invention has thus far been described in conjunction with a preferred embodiment thereof, it is to be understood that modifications will be apparent to those skilled in the art without departing from the spirit of the invention. For example, although a combination of the first releasing arm and the second releasing arm is used as the releasing arrangement in the above-mentioned embodiment, the releasing arrangement is not restricted to such a structure.

What is claimed is:

1. A recording and/or reproducing device which is adapted to have a cartridge loaded therein, wherein the cartridge accommodates a magnetic tape and a leader pin connected to an end portion of the magnetic tape, and the recording and/or reproducing apparatus comprises a single take-up reel for taking up the magnetic tape, said recording and/or reproducing device comprising:
   a chassis;
   a grabber, which is coupled to said take-up reel via a leader tape, to grab the leader pin, said grabber and said leader pin forming a pull-out assembly when said grabber is coupled to said leader pin;
   a grabber holder which holds said grabber while attaching the grabber to and detaching the grabber from the leader pin;
   a locking member which locks said leader pin during movement of the pull-out assembly between said grabber holder and said take-up reel, and which is movable between a retracted position where said leader pin is not locked and a locking position where said leader pin is locked;
   an urging arrangement which urges said locking member toward said locking position; and
   a releasing arrangement which causes said locking member to retract to said retracted position against an urging force of said urging arrangement when said grabber comes close to said cartridge, and which causes said locking member to move to said locking position when said grabber moves away from said cartridge;
   wherein said grabber comprises a grabber body, said grabber is rotatably and slidably mounted on said chassis, and said locking member is mounted in said grabber body so as to be movable in a horizontal direction; and
   wherein said releasing arrangement comprises:
      a first releasing arm, rotatably mounted to said grabber body, for engaging with said locking member; and
      a second releasing arm, rotatably mounted on said grabber holder, for rotatably moving said first releasing arm in accordance with a sliding operation of said grabber holder.

2. The recording and/or reproducing device as claimed in claim 1, further comprising a sliding mechanism for making said grabber holder slide on said chassis.

* * * * *